June 12, 1962 F. W. WENDELBURG ET AL 3,039,036
CONTROL APPARATUS
Filed June 15, 1956 6 Sheets-Sheet 1
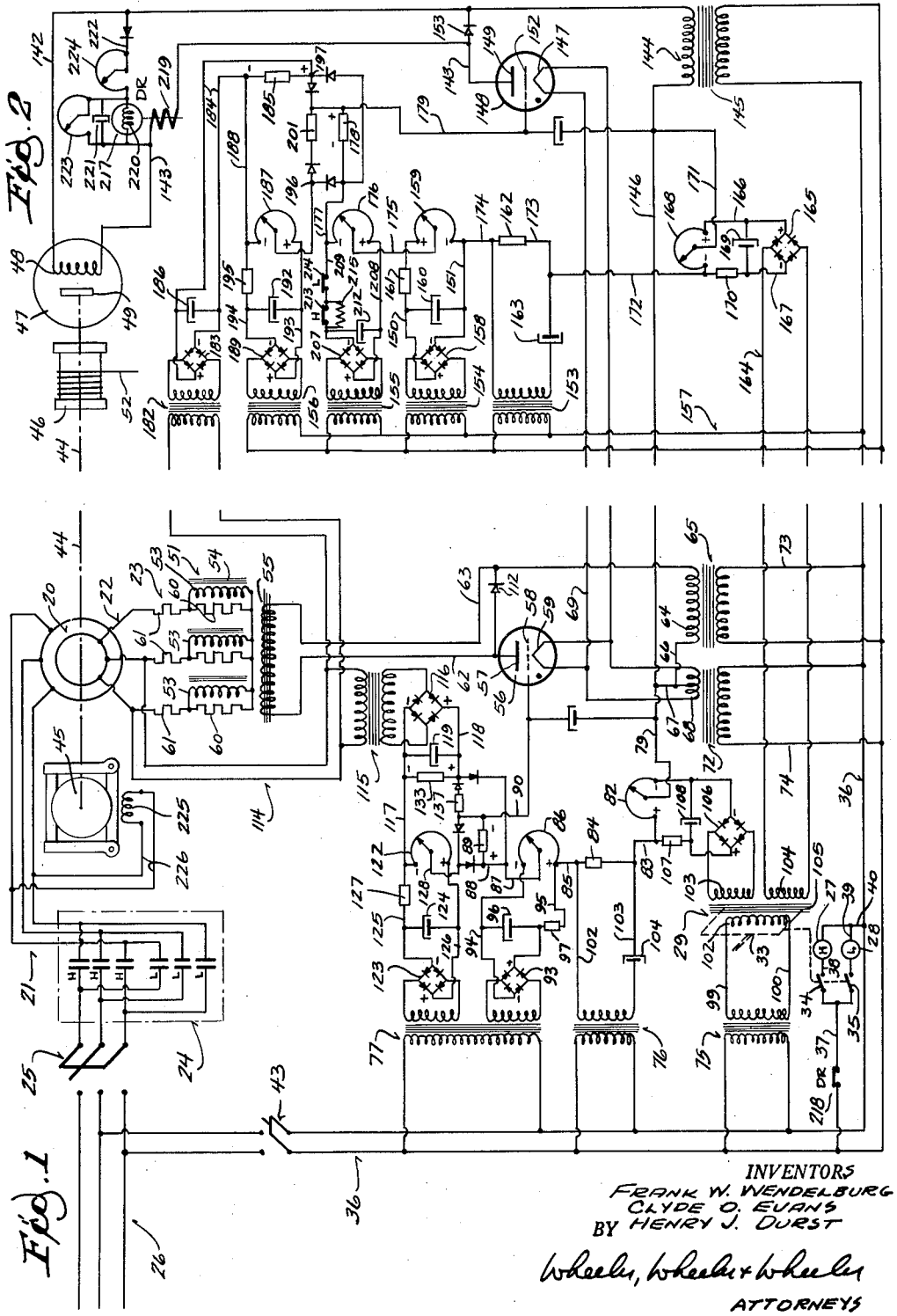
INVENTORS
FRANK W. WENDELBURG
CLYDE O. EVANS
BY HENRY J. DURST
Wheeler, Wheeler & Wheeler
ATTORNEYS

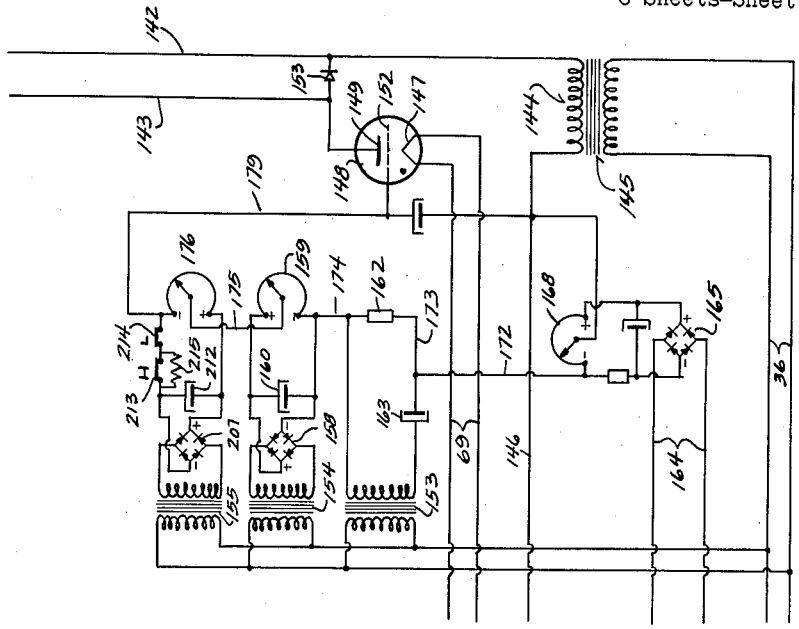
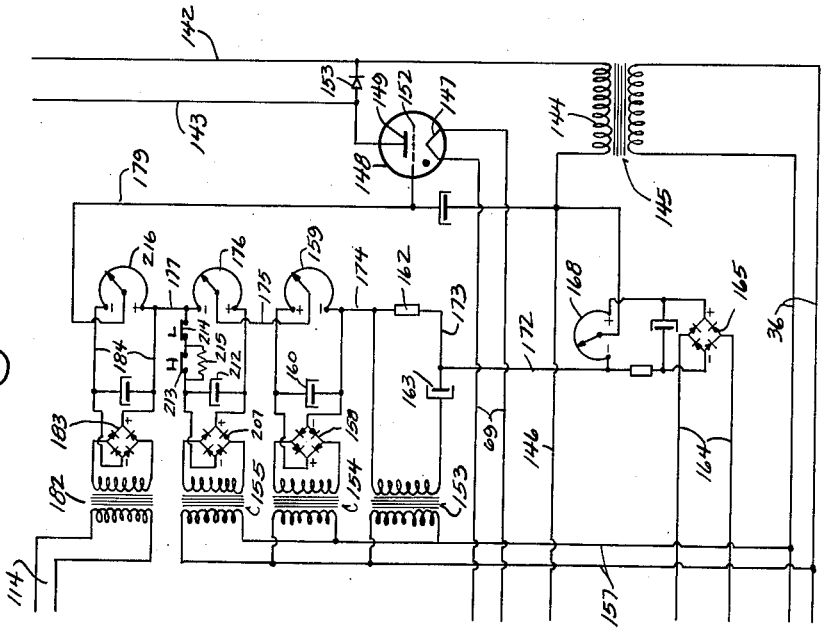

June 12, 1962 F. W. WENDELBURG ET AL 3,039,036
CONTROL APPARATUS
Filed June 15, 1956 6 Sheets-Sheet 3
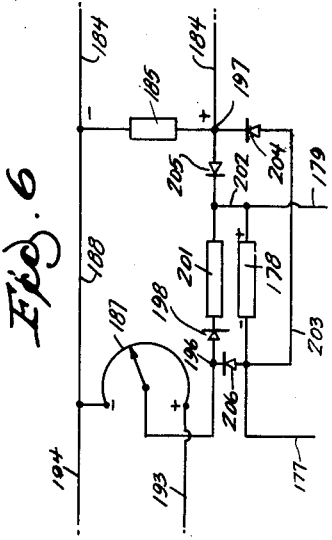
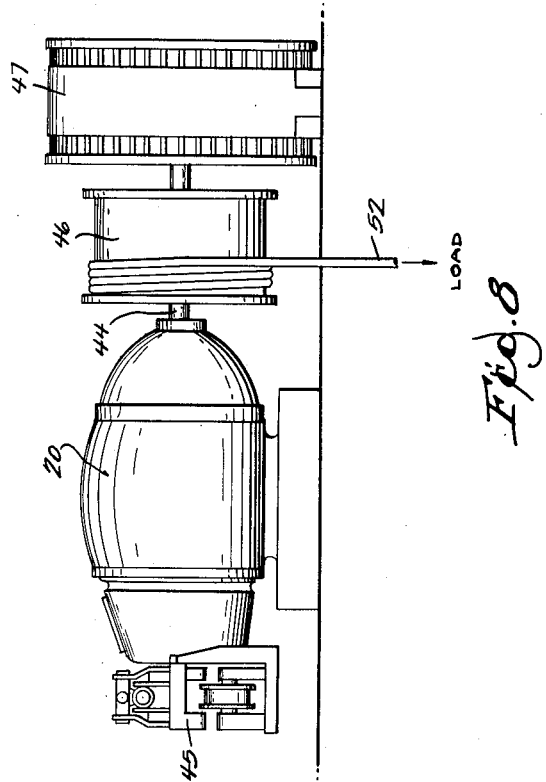
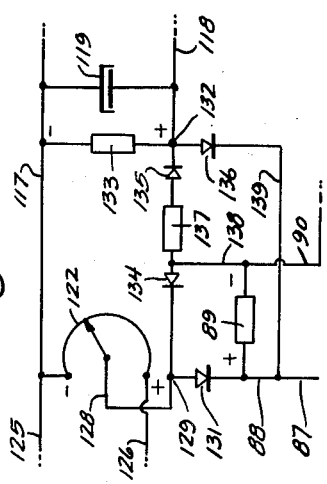
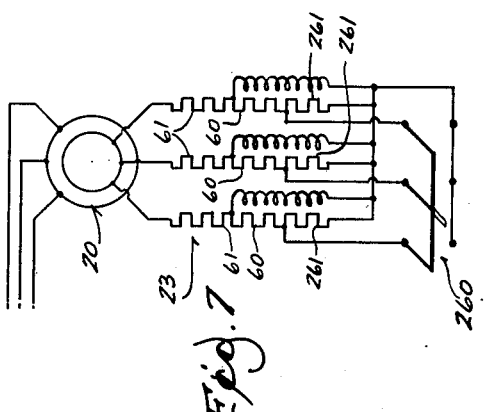
INVENTORS
FRANK W. WENDELBURG
CLYDE O. EVANS
BY HENRY J. DURST
Wheeler, Wheeler & Wheeler
ATTORNEYS June 12, 1962 F. W. WENDELBURG ET AL 3,039,036
CONTROL APPARATUS
Filed June 15, 1956 6 Sheets-Sheet 4
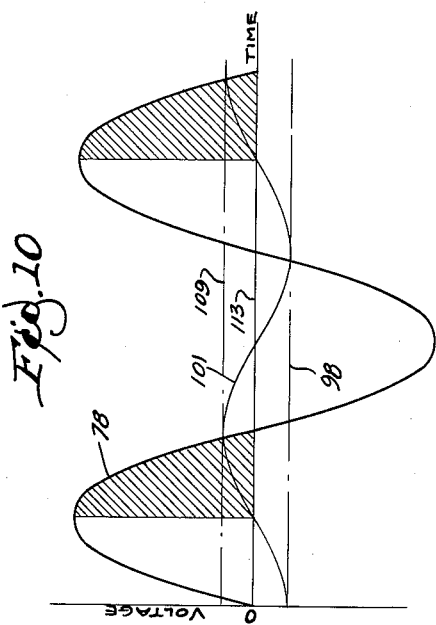
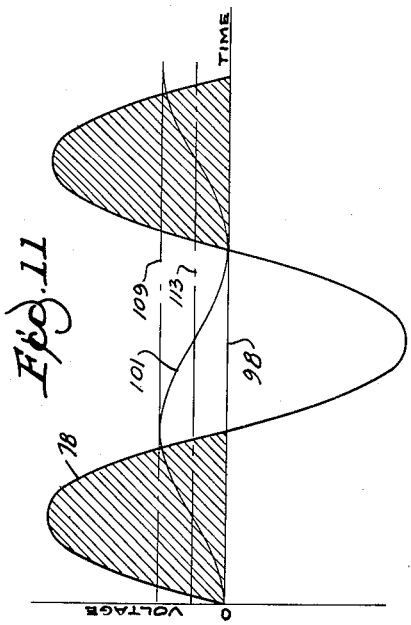
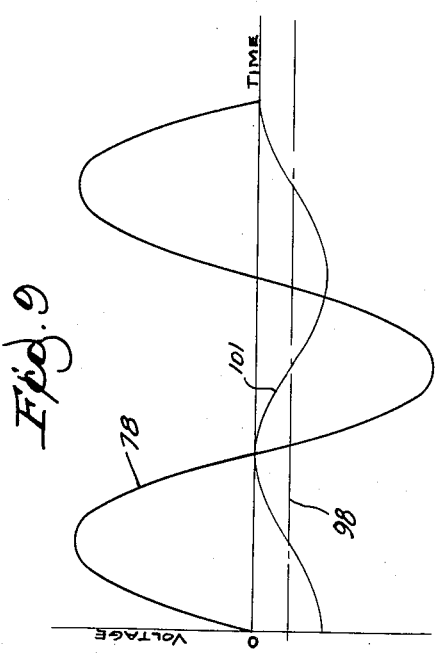
INVENTORS
FRANK W. WENDELBURG
CLYDE O. EVANS
BY HENRY J. DURST
Wheeler, Wheeler & Wheeler
ATTORNEYS June 12, 1962   F. W. WENDELBURG ET AL   3,039,036
CONTROL APPARATUS
Filed June 15, 1956   6 Sheets-Sheet 5
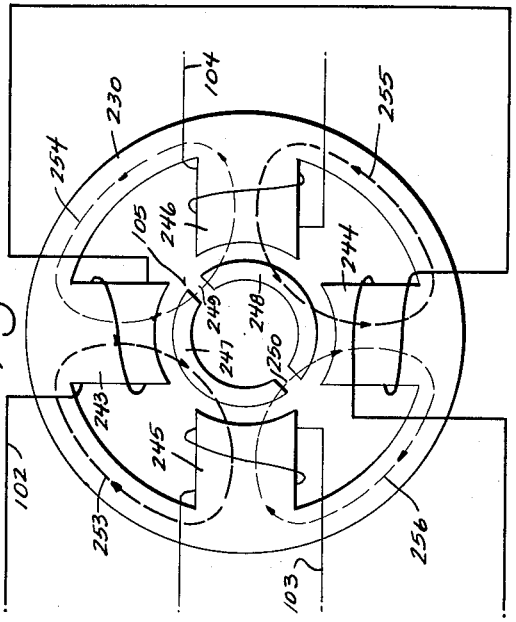
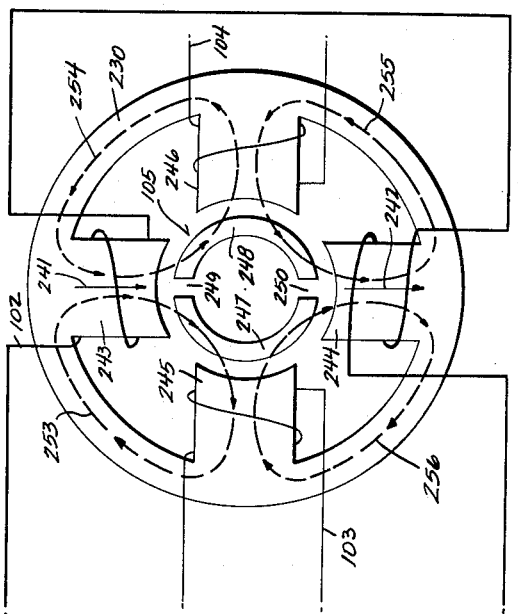
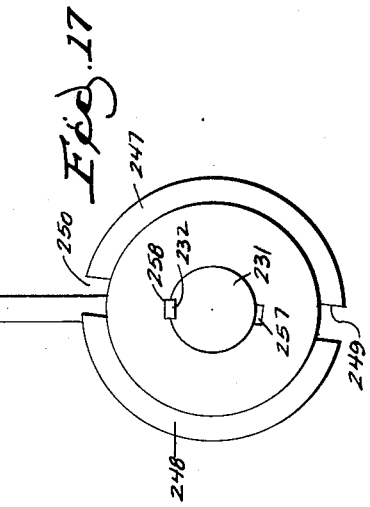
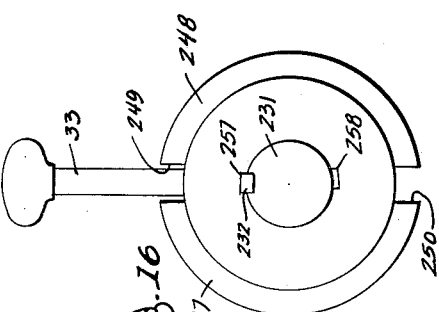
INVENTORS
FRANK W. WENDELBURG
CLYDE O. EVANS
BY HENRY J. DURST
Wheeler, Wheeler & Wheeler
ATTORNEYS June 12, 1962  F. W. WENDELBURG ET AL  3,039,036
CONTROL APPARATUS
Filed June 15, 1956  6 Sheets-Sheet 6
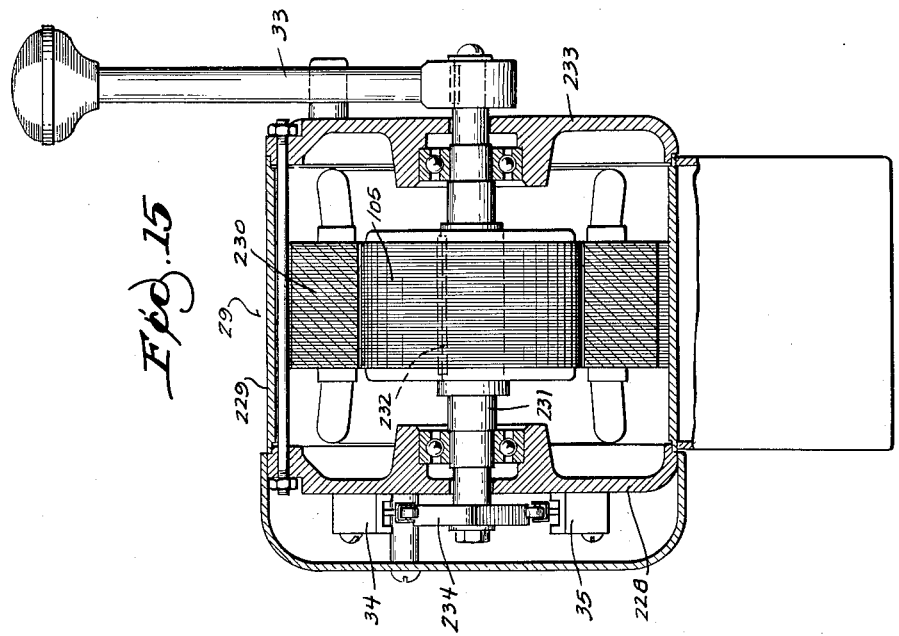
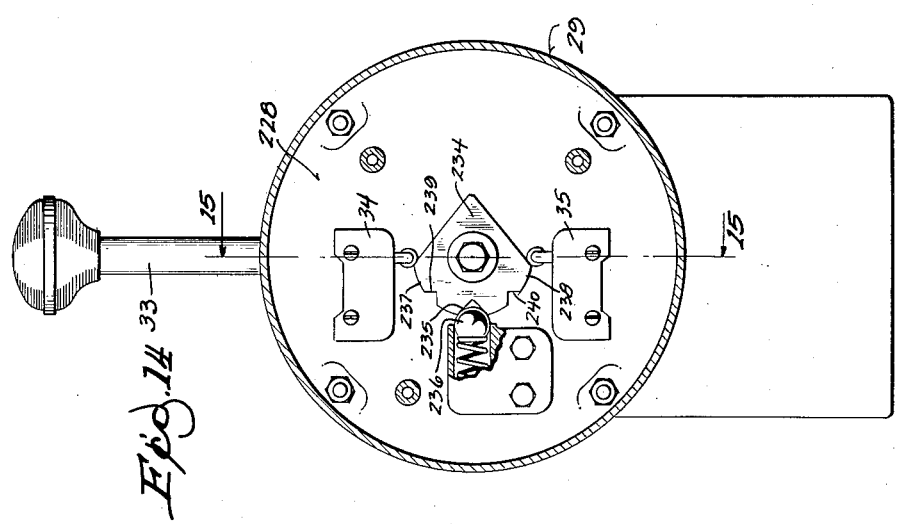
INVENTORS
FRANK W. WENDELBURG
CLYDE O. EVANS
BY HENRY J. DURST
Wheeler, Wheeler & Wheeler
ATTORNEYS United States Patent Office 3,039,036
Patented June 12, 1962

3,039,036
CONTROL APPARATUS
Frank W. Wendelburg, Clyde O. Evans, and Henry J. Durst, Milwaukee, Wis., assignors to Harnischfeger Corporation, Milwaukee, Wis., a corporation of Wisconsin
Filed June 15, 1956, Ser. No. 591,683
29 Claims. (Cl. 318—204)

This invention relates to control apparatus for electric motors and more particularly to electric motors used for powering the hoist, trolley and bridge motions of traveling cranes and other applications.

The present invention is a further development in the inventions claimed in United States Patents Nos. 2,493,607 and 2,689,934, in which induced current brakes are coupled to crane motors. In the apparatus of the prior patents aforesaid, the brakes may be energized in steps according to the manipulation of a controller which changes the resistance in the secondary circuit of the motor in steps. In the present invention, control over both the motor secondary resistance and brake excitation is stepless and the degree of control over the speed and torque of the motor is exceptionally fine and accurate.

In the device of the present invention the effective secondary resistance of the motor may be changed in stepless intervals by novel control apparatus including a saturation reactor having alternating current windings in circuit with the motor secondary circuit. The saturation or D.C. winding of the reactor is variably energized by an electron valve or static electric amplifier having a control element circuit including a manual control device. Inasmuch as very little current flows in the control element circuit of the electron valve, the manual control device, preferably an induction controller, has negligible resistance to manual manipulation thereof.

Speed regulation is desirably effected by superimposing on the control element of the valve a voltage proportioned to motor slip. Variations in the magnitude of the superimposed voltage are such as to cause energization of the saturation winding of the reactor in a manner to tend to maintain the speed of the motor constant, regardless of load. In practice the voltage proportioned to slip is derived from a feed-back connection to the secondary circuit of the motor.

The control element circuit for the electron valve may also be provided with means to discriminate between feed-back voltages above and below a predetermined value, usually the feed-back voltage at "stall." The circuit is such that feed-back voltages in excess of said predetermined value will cause a voltage to be superimposed on the control element of the electron valve of such a value that the saturation reactor will be energized to insert maximum resistance in the secondary circuit of the motor to protect the motor against excessive current flow in its windings during plugging.

The foregoing motor control is adaptable to control any of the motors which power the bridge, trolley and hoist motions of the crane. In the case of the motor which powers the hoist motion of the crane, where extremely fine control and speed regulation is desired, an electrically actuated brake coupled to the motor for the purposes stated in the prior patent aforesaid may be provided. The winding of the electrically actuated brake is desirably in circuit with the output of an electron valve having a control element excited in a circuit including an induction controller which is desirably interlocked with the controller for the motor circuit. In actual practice both induction controllers are incorporated in the same structure and are actuated by a common handle.

Feedback from the motor secondary circuit to the control element circuit of the brake control electron valve may be optionally provided. This feedback circuit to the brake control circuit may be modified to discriminate between feed-back voltages above and below a predetermined value, as aforestated, to provide for maximum brake excitation during plugging of the motor to assist the motor in imposing reverse torque upon the load.

The discriminating circuits aforesaid are embodied in the disclosed apparatus in the form of impedance networks comprising voltage proportioning impedances which superimpose upon the electron valve control element a voltage which varies in magnitude depending both upon the magnitude and polarity of a difference voltage resulting from a comparison of the feed-back voltage with an adjustably fixed reference voltage.

The induction controller is of novel design. Both primary and secondary circuits are wound on a common field frame, the mutual inductance therebetween being varied by changing the position of an armature element. Accordingly, no electrical connections need be made to the movable element, thus eliminating means for slip rings, etc. The induction controller is desirably embodied in rotary apparatus, primary and secondary poles being formed on a stator shell and the armature being formed on a rotary element therewithin.

The rotor is desirably provided with completely separate magnetic circuits for bridging between corresponding sets of primary and secondary poles. The rotor of the controller is preferably in the form of a split ring having air gaps separating the armature elements aforesaid.

Other features and advantages of the invention will be more apparent to one skilled in the art upon an examination of the following disclosure in which:

FIG. 1 is a circuit diagram showing a motor which may be used for any of the bridge, trolley or hoist motions of the crane and the control circuit therefor.

FIG. 2 shows the hoist winch and induced current brake which is mechanically coupled to the motor of FIG. 1 in the hoist apparatus of the crane, the control circuit components for the induced current brake being shown in phantom connection to the components shown in FIG. 1.

FIGS. 3 and 4 show modifications of the control circuit shown in FIG. 2.

FIG. 5 is an enlarged fragmentary circuit diagram of the discriminating circuit shown in FIG. 1.

FIG. 6 is an enlarged fragmentary circuit diagram of the discriminating circuit shown in FIG. 2.

FIG. 7 is a fragmentary circuit diagram of modified connections in the secondary circuit of the motor showing a manual switch for adapting the motor to handle excess loads during short periods of time.

FIG. 8 is a diagrammatic side elevation of a motor connected as shown in combined FIGS. 1 and 2.

FIGS. 9, 10 and 11 are wave form diagrams illustrating various relationships between anode voltage and grid control voltage of the thyratron power tubes used in the disclosed embodiment of the invention.

FIGS. 12 and 13 diagrammatically illustrate the structure and circuit of an induction controller according to the present invention.

FIG. 14 is a rear end view of the induction controller shown in FIG. 15, a cover pan being removed to expose details of switching apparatus thereon.

FIG. 15 is an axial cross section taken along the line 15—15 of FIG. 14.

FIGS. 16 and 17 diagrammatically illustrate the rotor assembly and illustrate the optional asymmetrical mounting of the rotor armature segments with respect to the neutral position of the controller handle.

A typical motor 20 to be controlled is preferably an alternating current induction motor having a polyphase primary circuit supplied with power from the polyphase leads collectively identified by reference character 21. The polyphase secondary circuit of the motor may comprise any conventional secondary circuit arrangement but in the embodiment shown consists of a polyphase wound rotor having external leads collectively identified by reference character 22 and connected to external resistance banks 23.

The input leads 21 to the primary circuit of the motor are supplied from power line 26 through conventional reversing switchgear 24 and manual switch 25. The switchgear 24 includes reversing contactors including one set of contactors H and another set L, these being alternatively engaged for reversing the polarity of the voltage applied through leads 21 to the motor primary.

Contactors H and L are electrically actuated by the coils 27, 28 which are alternatively energized depending upon the position of the relatively movable elements of an induction controller 29 illustrated diagrammatically in FIG. 1 and in detail in FIGS. 12–17. The handle 33 of induction controller 29 alternatively actuates the cam operated switches 34, 35 respectively in circuit with the H and L operating coils 27, 28, depending on the direction of desired motor rotor rotation.

The operating coils 27, 28 receive single phase power from branch leads 36 and lines 37, 38, 39 and 40 which connect the respective coils 27, 28 through switches 34, 35 across the leads 36. We may optionally provide leads 36 with a manually operated switch 43.

Motor 20 is provided with a rotor shaft 44 to which a conventional electrically released mechanical brake 45 is coupled. If the motor 20 is used to power bridge or trolley motions, shaft 44 is connected through appropriate conventional gearing (not shown) to the drive wheels for the trolley or bridge. If the motor 20 is used to power hoist motions, shaft 44 is mechanically coupled to the hoist drum 46 and to an electrically actuated brake 47 as shown in FIGS. 2 and 8. Brake 47 is desirably of the induced current type. In the specific embodiment shown in the drawings it includes a stationary field winding 48 and a rotor member 49 in which eddy currents are induced to provide torque which resists rotation of the motor. Further description of the brake 47 will not be given here, reference being made to the prior patents aforesaid for details of a specific embodiment thereof.

As in the device of the prior patents aforesaid, the hoist drum 46 is subject to an overhauling load imposed thereon through the cable 52. As in the prior patents aforesaid an important object of the hoist circuit of the present invention is to provide a control for the motor 20 in which the rate of speed of the motor for any particular controller setting will remain comparatively constant whether the torque demand be light or heavy. In the apparatus of the present invention speed regulation of the motor 20 is effected substantially entirely through control of the effective value of the external resistances 23 if the motor is coupled to the drive wheels of the trolley or bridge. If the motor is coupled to the hoist drum 46 speed regulation is effected by the combined effect of control of the effective value of the external resistances 23 and the excitation of the induced current brake 47.

For control of the effective value of secondary resistances 23, a saturation reactor 51 having its respective A.C. windings 53 is connected in shunt with the major portions 60 of the respective resistances 23. Minor portions 61 of the resistances 23 are not in shunt with the windings 53. Accordingly, resistance portions 61 will be in circuit with the motor secondary even when the resistance portions 60 are short circuited by windings 53, thus to protect the motor secondary against excessive current flow.

The saturation reactor 51 includes a D.C. saturation winding 55 which develops a direct current field which links with the cores 54 upon which the alternating current windings 53 are wound, as is conventional in the reactor art.

The inductive reactance of the A.C. windings 53 is at a maximum when the respective cores 54 are free of saturation flux. The inductive reactance of the A.C. windings 53 is at a minimum when the cores 54 are fully saturated. Accordingly, when D.C. winding 55 is not energized and hence cores 54 are relatively unsaturated, the inductive reactance of A.C. windings 53 will be so high with respect to the impedance of resistance portions 60 that the A.C. windings 53 will have no substantial effect upon the overall impedance of the secondary circuit and substantially the entire resistance 23 will be in circuit with the wound rotor of the motor. Under this condition the motor will deliver relatively little torque and for any given load will operate at low speed.

However, if substantial amount of D.C. current flows through the saturation winding 55 to saturate cores 54, the windings 53 will function as though wound on an air core and will have relatively little inductive reactance. In effect the windings 53 short circuit resistance portions 60. Accordingly, only resistance portions 61 are in circuit with the wound rotor of the motor and the motor is capable of delivering relatively large torque and for the same given load will operate at a relatively high speed.

Excitation of the saturation winding 55 intermediate maximum and minimum D.C. current values aforesaid will result in intermediate speeds of the motor for given torque requirements. If the current flowing in saturation winding 55 is varied in stepless intervals very fine control of motor speed and torque is achieved.

Voltage for saturation winding 55 is supplied in the device of the present invention under control of an electron valve or electric amplifier. While the electron valve may be of any type suitable for the purposes of the invention, such as a space discharge device, semi-conductor such as a transistor, magnetic amplifier, rotating amplifier, etc., a conventional electron tube or thyratron 56 is preferred. In commercial practice a thyratron of type ELC16J has been found to be suitable.

Thyratron 56 is provided with an anode 57, a grid control element 58 and a cathode 59. Anode 57 is connected by line 62 to saturation winding 55 and thence by line 63 to the secondary winding 64 of transformer 65. Transformer secondary winding 64 is connected by line 66 to the center tap 67 of filament secondary winding 68 of transformer 72 and thence through lines 69 to thyratron filament 59. The primary windings of transformers 65 and 72 are connected by their respective input leads 73, 74 to the single phase supply line 36.

Line 36 also supplies power to the primary windings of transformers 75, 76 and 77, which supply the various control components as hereinafter explained.

The output of thyratron 56 is controlled by changing the direct current component of voltage applied to its grid 58. For this purpose control voltage components are added in the grid circuit, the resultant voltage being applied to the grid for control effects on the output of the tube.

The instantaneous voltage impressed between anode 57 and cathode 59 by transformer 65 is indicated on the wave form diagram of FIG. 9 by sine wave curve 78.

Grid voltage is applied between grid 58 and center tap 67 of the filament transformer through line 79, controller voltage potentiometer 82, line 83, A.C. rider voltage resistor 84, line 85, D.C. negative bias voltage potentiometer 86, lines 87, 88, resistor 89 in the feed-back impedance network and line 90 to grid 58.

The D.C. negative bias voltage developed across potentiometer 86 derives from the bridge rectifier 93 and its output lines 94, 95 connected to the ends of the potentiometer 86. A conventional filter condenser 96 and current limiting resistor 97 may be included in the circuit. The negative D.C. bias voltage is indicated by wave form 98 in FIG. 9.

To the D.C. grid bias voltage 98 is applied an A.C. rider voltage indicated by wave form 101 in FIG. 9. Voltage 101 derives from phase shift transformer 76 and is impressed by lines 102, 103 through condenser 104 across resistor 84. Transformer 76 and condenser 104 in line 103 shift the phase of the A.C. voltage 101 to lag anode voltage 78 by 90°, as is clearly shown in FIG. 9.

D.C. grid bias voltage 98 is desirably adjusted to be at least equal to or slightly greater than the peak instantaneous voltage of the A.C. rider voltage 101. Accordingly, if combined voltages 98 and 101 were the sole source of grid excitation, grid 58 would never become positive and the tube would never fire. Under this circumstance the tube 56 would have zero output to the saturation winding 55 of the reactor. This condition obtains when the controller handle 33 is in its neutral position and there is no D.C. voltage developed across the potentiometer 82.

The details of the controller 29 are shown in FIGS. 12 through 17 and will be hereinafter described with greater particularity. For the purpose of describing the circuit it is sufficient at this juncture to note that the controller desirably comprises a primary winding 102 and two secondary windings 103 and 104 all wound upon a stator. Primary winding 102 is energized by transformer 75 through lines 99, 100. The mutual inductance between the primary and respective secondary windings is varied by rotating a split ring armature core 105 by its handle 33.

With handle 33 in its neutral position there is little or no mutual inductance between primary and secondary windings 102, 103. As handle 33 is moved from neutral in either direction core 105 will rotate in such a manner to increase the mutual inductance between the primary winding 102 and secondary windings 103, 104. Accordingly, the voltage induced in secondary winding 103 will vary depending on handle position. The voltage developed across winding 103 is rectified in the bridge rectifier 106 and is impressed across the controller potentiometer 82 through a circuit including resistor 107 and filter condenser 108.

Regardless of the direction of movement of handle 33 the polarity of the potentiometer 82 will be positive with respect to the grid 58. If handle 33 is positioned at approximately the halfway point in either direction of its movement, the D.C. positive voltage developed across potentiometer 82 is indicated by wave form 109 in FIG. 10. Positive voltage 109 substantially cancels the negative grid bias voltage 98 across potentiometer 86. The resultant bias voltage is thus reduced to zero as indicated at 113 in FIG. 10. Accordingly, rider voltage 101 is raised to its position shown in FIG. 10 in which the grid will become positively charged when the anode voltage 78 is at its peak. As soon as the grid becomes positive the tube will fire. When the anode voltage 78 reaches zero the tube will be cut off. The quantity of anode voltage in this condition of circuit operation is indicated by the cross hatching in FIG. 10. To smooth out the intermittent bursts of anode voltage a back rectifier 112 is disposed across the inductive load as is conventional in the art.

It is clear that advance of controller handle 33 in a direction to increase the mutual inductance between its primary and secondary windings will increase the voltage developed across controller potentiometer 82 to cause the alternating current rider voltage 101 to fire tube 56 still earlier in the cycle of the anode voltage. FIG. 11 illustrates a condition in which the induction controller is advanced to maximum position in which the sum of controller voltages 109 and 98 is represented by voltage 113 and the alternating current voltage 101 is positive at all times. Under these circumstances the tube will fire continuously as long as its anode is positive as indicated by the cross hatched area under curve 78 in FIG. 11.

As aforesaid changes in voltage output of the tube will change the excitation of the saturation winding 55 of the reactor for the control effects on the motor hereinbefore explained. As the grid voltage is infinitely variable stepless control of motor speed and torque is achieved.

In the circuit of the present invention important speed regulation and other control effects are achieved in the novel feed-back circuit disclosed. Feed-back lines 114 are connected across two of the terminals of the polyphase secondary windings of the motor. Accordingly, voltage in lines 114 varies as the slip speed of the motor. The primary of transformer 115 is connected to feed-back lines 114 and the transformer secondary winding is connected to a bridge rectifier 116 having its output connected to lines 117 and 118 and filter capacitor 119.

If the motor operates at synchronous speed motor slip is zero and the feed-back voltage is zero. As the speed of the motor falls off and slip increases feed-back voltage in lines 114 correspondingly increases. If the motor speed drops to zero, or standstill, slip and feed-back voltage is regarded for the purpose of this disclosure as 100%. Slip and feed-back voltage can be as high as 200% if the motor is operating at synchronous speed in one direction and is plugged. For example, if the controller handle 33 is full on in one direction and abruptly reversed to full on in the opposite direction, thus plugging the motor, instantaneous slip voltage will be 200%, quickly dropping to 100% when the motor rotor reaches stall position and dropping below 100% as the rotor reverses.

To obtain speed regulation and also to protect the motor during plugging, the feed-back voltage aforesaid is applied to a circuit which superimposes on the grid 58 of thyratron 56 a voltage which varies in accordance with the magnitude of the feed-back voltage. The D.C. voltage across lines 117, 118 is directly proportional to the slip voltage aforesaid. For slip voltages between zero and 100%, the feed-back voltage regulates speed. For slip voltages above 100% the feed-back voltage triggers the thyratron to insert maximum resistance in the motor secondary circuit for motor protection purposes.

To vary the response of the control circuit as aforesaid a circuit is provided to discriminate between feed-back voltages above and below a predetermined value, usually that corresponding to 100% slip. Any other predetermined value, for example 80% slip if motor protection is desired at slip voltages thereabove, could be selected.

The discriminating circuit as shown in FIG. 1 and in enlarged fragmentary form in FIG. 5 includes a reference potentiometer 122 from which an adjustably fixed reference voltage is derived. The potentiometer 122 is supplied from transformer 77 through bridge rectifier 123, lines 125, 126, filter condenser 124 and current limiting resistor 127. The movable element of the potentiometer is connected by line 128 to terminal 129 of an impedance network having an opposite terminal 132 connected to line 118 and to one side of feed-back load resistance 133 to which the output voltage of bridge rectifier 116 is applied. Note that the reference voltage and the feed-back voltage are so polarized that the terminals 129, 132 are of positive polarity with respect to the respective resistances 122, 133.

The impedance network includes rectifiers 131, 134, 135 and 136, polarized as indicated in FIGS. 1 and 5. The impedances with respect to which the difference voltage between the respective voltages across resistances 122, 133 is divided consist of resistances 89 and 137. It will be observed that resistance 89 is in direct series connection between line 87 and line 90 leading to the grid 58 of tube 56. Resistance 137 is out of direct series connection with the grid of the tube. Resistance 89 desirably has a much lower ohmic value than resistance 137. Merely by way of example, resistance 89 may be in the range of 15,000 ohms and resistance 137 may be in the range of 47,000 ohms.

The relative values of reference potentiometer 122 and feed-back load resistance 133 are so related that at all motor speeds between zero slip and 100% slip (for example) the voltage developed across resistance 133 will be less than the voltage developed across potentiometer 122. These voltages are compared in the circuit disclosed and the difference therebetween will cause current to flow between the terminals 129, 132 of the impedance network on paths determined by the resultant polarity of the difference voltage and the respective rectifiers 131, 134, 135, 136.

In the foregoing example, between zero slip and 100% slip in which the reference voltage across potentiometer 122 exceeds the feed-back voltage developed across resistance 133, the net difference voltage will have a polarity at which terminal 129 will be positive with respect to terminal 132. Accordingly, current will flow from terminal 129 through rectifier 131, resistance 89, line 138, resistance 137 and rectifier 135 to terminal 132. Accordingly, the potential difference between terminals 129, 132 and along the foregoing path will be divided between resistances 89 and 137 in proportion to their respective ohmic values. Since the ohmic value of resistance 89 is much lower than that of resistance 137, only a minor portion of said potential difference is developed across resistance 89. The voltage across resistance 89 is directly additive in the grid circuit to the controller voltage across potentiometer 82, the D.C. bias voltage across potentiometer 86, and the A.C. voltage across resistance 84 and has a negative polarity with respect to the grid as indicated in the circuit diagram. Accordingly, any voltage across resistance 89 opposes the voltage across the controller potentiometer 82 and tends to reduce the grid voltage.

Under the foregoing condition speed regulation is effected between all conditions of motor operation between stall and synchronous speed. If the motor tends to speed up, its slip or feed-back voltage drops, thus reducing the voltage developed across load resistor 133. Accordingly, the difference voltage between terminals 129 and 132 increases causing a greater current flow in the voltage proportioning network aforesaid to increase the voltage drop across resistance 89. The voltage on grid 58 will accordingly be reduced to correspondingly reduce excitation of the saturation winding 55 of the reactor. Under this condition the alternating current windings 53 of the reactor will have increased inductive reactance and the effective ohmic value of the grid resistances 23 will rise. This increase in effective resistance of the grid resistors will reduce the current flowing in the secondary circuit of the motor and tend to reduce the speed of the motor, all other factors being equal.

A reduction in speed of the motor will have the opposite effect in the grid circuit of the tube. A drop in speed will increase the slip or feed-back voltage developed across resistance 133 and accordingly reduce the potential difference between terminals 129, 132 of the impedance network. Thus the voltage developed across resistance 89 will drop tending to raise the voltage on the grid 58 and increase the voltage applied to the saturation reactor winding 55 with converse effects on the reactor windings 53 to reduce the effective resistance of the resistance portions 60 of banks 23 and permit increased flow of current in the rotor of the motor to tend to increase the speed of the motor. In the foregoing manner speed will be stabilized and variations from a set speed will be opposed.

When the slip or feed-back voltage exceeds 100% slip in the foregoing example the voltage developed across resistance 133 will exceed the reference voltage developed across potentiometer 122. Accordingly, terminal 132 will be positive with respect to terminal 129 and a current proportional to the difference voltage will flow from terminal 132 through rectifier 136, line 139, line 88, resistance 89, line 138 and rectifier 134 to terminal 129.

The direction of current flow through resistance 89 is the same as in the case of feed-back voltages less than 100% slip, but resistance 137 is out of the circuit. Accordingly, the entire difference voltage is imposed across resistance 89.

The full difference voltage across resistance 89 exceeds and opposes the controller voltage across potentiometer 82 and drives the grid of the tube negative, thus reducing excitation of the saturation winding 55 of the reactor to zero. Under these circumstances the inductive reactance of the A.C. windings 53 of the reactor is maximum and the entire ohmic value of the resistances 23 is effective in the secondary circuit of the motor to protect the motor against the excessive current surges therein during motor operations in excess of 100% slip.

The foregoing condition obtains during plugging of the motor, for example when the operator moves the controller handle 33 from some position in which the motor rotor rotates in one direction to an opposite position in which the contactors in the reversing connections 24 operate to reverse the input leads to the primary circuit of the motor and reverse the direction of the rotating field. At the end of the period of time required for the rotor to reverse direction, and as soon as the slip drops below 100% the reference voltage across potentiometer 122 will again exceed the feed-back voltage across load resistance 133 and the polarity between terminals 129 and 132 will again reverse to make terminal 129 positive with respect to terminal 132. At this time the current flowing in the voltage proportioning network aforesaid will follow the path first above described and the tube 56 will again function for speed regulating effects on the motor as aforesaid.

The foregoing description applies equally to motor 20 and the control circuit of FIG. 1 regardless of the specific use to which the motor is put in the traveling crane. The same circuit is used whether the motor powers the hoist, trolley or bridge. Under all conditions of use extremely accurate stepless control of speed is effected.

For the reasons stated in the prior patent aforesaid, it is desirable to preload the motor which powers the hoist motion of the crane. For this purpose brake 47 is mechanically coupled to motor shaft 44 as aforesaid. Brake 47 may be any brake having electrically controlled actuating means. For the purpose of the present invention an induced current brake having a winding 48 and an eddy current member 49, of the type more fully described in the prior patent aforesaid, is preferred. However, any electrically actuated brake having a control impedance could be adapted for use in the device of this invention.

The winding 48 of brake 47 is supplied with energizing voltage through lines 142, 143. Line 142 is connected through the secondary winding 144 of transformer 145 and line 146 to the center tap 67 of the filament winding 68 which energizes the filament 147 of electron valve 148. A thyratron tube which may be a type ELC16J gas filled tube is desirably employed. Tube 148 has an anode 149 and a grid 152. Anode 149 is connected to line 143, a back rectifier 153 being disposed between lines 143, 142 for smoothing out the voltage output of the tube in the manner aforesaid.

Control of the voltage output of tube 148 is achieved in much the same manner as is the case with tube 56. Respective transformers 153, 154, 155 and 156 have their primary windings energized by supply lines 157 connected to the branch supply line 36. The output of transformer 154 is rectified in bridge rectifier 158 and impressed through lines 150, 151, filter condenser 160 and resistance 161 across the grid bias potentiometer 159. An A.C. rider voltage is impressed across resistance 162 from the output of the phase shifting transformer 153 and condenser 163.

Winding 104 of induction controller 29 is connected by lines 164 to bridge rectifier 165 having its output terminals connected through lines 166, 167, filter condenser 169 and resistance 170 to the terminals of control voltage potentiometer 168. The movable element of the potentiometer 168 is connected by lines 171 and 146 to the center tap 67 of filament transformer 68 and thence to the filament 147 of tube 148. Potentiometer 168 is also connected in sequence to lines 172 and 173, A.C. rider voltage load resistance 162, line 174, D.C. bias voltage potentiometer 159, line 175, potentiometer 176 and thence by line 177 through the resistance 178 in the impedance network shown in FIGS. 2 and 6 and line 179 to the grid 152 of tube 148.

Three modifications of control circuit for the winding 48 of the brake 47 are shown respectively in FIGS. 2, 3 and 4. The control components and their connections are generally similar, the principal difference between the various circuits being in the feed-back connection to the grid circuit from the secondary circuit of the wound rotor of motor 20.

From the polarity markings on FIGS. 2 of the drawing it will be observed that the polarity of the various direct current voltage components in the grid circuit of tube 148 are generally just the opposite from the polarity of similar components in the grid circuit of tube 56 as shown in FIG. 1. The direct current bias derived across potentiometer 159 is positive and the controller voltage derived across potentiometer 168 is negative with respect to the tube grid 152.

Accordingly, at low values of mutual inductance between primary and secondary windings of the induction controller 29 the grid 152 of tube 148 will be highly positive because of the D.C. positive grid bias aforesaid and the winding 48 of the brake 47 will be highly excited to impose a relatively heavy drag on the hoist drum 46. However, as the controller handle 33 is moved toward higher speeds, either in hoist or lower direction, the increased negative potential developed across controller potentiometer 168 will reduce the positive excitation of the tube grid 152 to correspondingly reduce the voltage supplied to winding 48 of the brake and reduce its drag on the hoist drum 46. This condition exists in the movement of the controller handle both in the hoist and lower direction although as will be hereinafter pointed out more in detail a differential effect is obtained between hoist and lowering movement of the control handle because of the asymmetrical relation between the rotor and stator of the controller.

Accordingly at light loading of the hoist drum 46, when relatively little current would otherwise be drawn by motor 20, relatively heavy excitation of the brake 47 occurs to add the drag of the brake to the load, thus requiring greater output of the motor to overcome both the resistance of the load and the brake 47 for the purposes outlined in the prior patents aforesaid. With relatively heavy loads on the hoist drum 46 the brake coil 48 is relatively lightly excited. Accordingly, the torque output demand on the motor tends to stabilize, regardless of the specific load on cable 52.

In the circuit shown in FIG. 2, feed-back voltage from the secondary circuit of the motor 20 is employed to superimpose upon the grid 152 of tube 148 a voltage which very finely controls the output of tube 148 in response to instaneous changes in motor speed. The feed-back voltage is used both for speed regulation effects and to produce maximum drag of the brake on the motor shaft during plugging of the motor to assist the reverse torque of the motor in reversing direction of rotation of its rotor. The feed-back line 114 is connected through transformer 182 to bridge rectifier 183, the D.C. output of which is impressed by lines 184 on a load resistance 185 in a voltage comparison and discriminating circuit shown enlarged in FIG. 6 and which has a function very comparable to the comparison and discriminating circuit for control on the saturation winding 55 of the motor, as shown in FIGS. 1 and 5. The output of rectifier 183 is filtered by condenser 186 across lines 184.

Voltage across resistance 185 is compared to an adjustably fixed reference voltage developed across potentiometer 187, the respective terminals of load resistance 185 and potentiometer 187 being connected by line 188 and the impedance network to be hereinafter described. A source of voltage for potentiometer 187 is derived from the bridge rectifier 189 connected to the secondary winding of transformer 156. The output of rectifier 189 is filtered by condenser 192 and is connected by lines 193, 194 and through current limiting resistor 195 to the terminals of potentiometer 187.

At feed-back voltages less than 100% slip the potential developed across resistance 185 will be less than the adjustably fixed potential developed across potentiometer 187. Thus the difference between the respective voltages across the respective resistances 185, 187 will be polarized in a direction to cause current to flow from terminal 196 toward terminal 197 of the voltage comparison network. The potential of terminal 196 of the voltage comparison network is thus higher than the potential of terminal 197.

The current path will be from terminal 196 through rectifier 198, resistance 201, cross connection 202, resistance 178, line 203 and rectifier 204 to terminal 197. The ohmic value of resistance 178 is selected to be materially less than the ohmic value of resistance 201. For example, resistance 178 may be 15,000 ohms and resistance 201 may be 100,000 ohms. Accordingly, only a minor portion of the voltage between terminals 196, 197 is developed across resistor 178 which is in direct series connection with line 179 to the grid 152 of tube 148. As indicated in the drawing this voltage is positive with respect to the grid and is superimposed upon the other voltages in the grid control circuit.

At conditions of feed-back voltage less than 100% slip the discriminating and voltage proportioning network shown in FIG. 6 functions to finely control excitation to brake winding 48 in the following manner: If motor 20 tends to speed up, slip or feed-back voltage impressed across resistance 185 drops and the difference voltage between terminals 196, 197 increases. This results in an increase in the voltage developed across resistance 178 and an increase in the excitation of grid 152, thus increasing the output of the tube 148 to winding 48, thereby increasing the drag of brake 47 with a resultant tendency to reduce the speed of the motor.

Conversely if motor speed drops the slip or feed-back voltage will be increased across resistance 185, thus reducing the voltage difference between terminals 196 and 197 and correspondingly reducing the voltage across resistance 178 and reducing the positive bias voltage on the grid 152 of tube 148 to reduce the output of the tube of winding 48, thereby reducing the drag of brake 47 to permit the motor to speed up.

Accordingly, under the foregoing conditions, the circuit shown in FIGS. 2 and 6 promotes good speed regulation of the hoist motor 20. The circuit and components of FIG. 2, of course, cooperate with the circuit and components of FIG. 1 in overall speed regulation of motor 20. Accordingly, both the resistance of the secondary circuit of motor 20 and the excitation of brake 47 varies in accordance with speed and torque of the motor for the regulation effects hereinbefore described.

For slip in excess of 100%, as when the motor is plugged, the voltage across load resistance 185 will exceed the reference voltage across potentiometer 187 and the difference voltage between terminals 196 and 197 will be polarized oppositely from the condition just described. Terminals 197 will be positive with respect to terminal 196. Under this condition a current will flow in the voltage proportioning network from terminal 197 through rectifier 205, cross connection line 202, resistance 178, rectifier 206 to terminal 196. Accordingly, resistance 201 is out of the circuit and substantially the entire difference voltage is impressed directly on resistance 178, although the polarity of the potential difference is the same as in the previously described instance.

Under these circumstances the grid 152 of tube 148 is driven highly positive and the negative potential across controller potentiometer 168 is completely overbalanced. Accordingly, the tube will deliver maximum voltage output to the winding 48 of the brake 47 to impose maximum drag on the shaft of the hoist drum 46. Thus, during plugging of the motor, the maximum drag of the brake is imposed on the hoist drum to assist the reverse torque of the motor 20 in bringing the drum to stall. At stall the slip voltage drops below 100% and terminal 196 of the voltage proportioning network again becomes positive with respect to terminal 197 and the controller 29 regains control of tube 148 in the manner aforesaid.

But for the potentiometer 176 tube 148 would be quite highly excited at the neutral position of controller handle 33. This is because of the relatively fixed positive D.C. voltage across potentiometer 159. However, it is desirable to materially reduce brake excitation at the standstill position of the motor to reduce heat losses in the brake. Accordingly, potentiometer 176 in the grid circuit is polarized oppositely with respect to potentiometer 159. Potentiometer 176 is supplied by transformer 155 and bridge rectifier 207 with D.C. voltage through lines 208, 209 and filter condenser 212.

Line 209, however, includes series connected H and L coil actuated contactor switches 213 and 214 respectively, both of which are normally closed. Resistor 215 may be optionally disposed across hoist relay actuated contactor switch 213. Accordingly, with the controller handle 33 in neutral or standstill position, both switches 34, 35 accordingly being open and H and L coils 27, 28 both being de-energized, contactor switches 213, 214 are both closed to complete the circuit to the potentiometer 176. The voltage across potentiometer 176 is normally set to exceed the grid bias voltage across potentiometer 159 by an amount sufficient to drive the grid of the tube negative for most values of A.C. rider voltage. The tube is desirably permitted to fire on peak values of A.C. rider voltage so that the tube delivers a low output voltage to the winding 48 of the brake. Thus the brake 47 is lightly energized at standstill. Of course, the voltage across potentiometer 176 may be optionally set at any value to give any desired effect in the grid circuit of tube 148.

As the controller handle 33 is advanced, for example in the lowering direction to actuate the L coil 28, contactor switch 214 is opened to deenergize potentiometer 176. Accordingly the control effect of the controller 29 and feed-back circuit is fully restored. When the controller handle 33 is moved in the hoist direction, contactor switch 214 is closed and contactor switch 213 opens in response to energization of H coil 27. However, because of the bypass resistor 215 a fixed reduced amount of voltage negative with respect to the grid remains across resistance 176. This potential opposes the positive D.C. bias voltage across potentiometer 159 to reduce the overall average excitation of brake 47 for motor operation in the hoist direction. The differential effect aforesaid is desirable in that it increases the lifting and break-away capacity of the motor in the hoist direction in which the load itself will normally provide adequate drag on the motor shaft.

FIG. 3 discloses a circuit embodiment similar to that shown in FIG. 2 but in which the slip or feed-back voltage of lines 114 is impressed directly on the grid circuit, the discriminating and voltage proportioning circuit of FIGS. 2 and 6 being omitted. In the circuit of FIG. 3 the reference characters for similar circuit components are the same as in FIG. 2.

The output of feed-back voltage bridge rectifier 183 is impressed through lines 184 directly upon the end terminals of feed-back potentiometer 216. The movable element of the potentiometer 216 is connected directly to grid line 179. The operation of the circuit shown in FIG. 3 is quite similar to that shown in FIGS. 2 and 6 except that there is no discrimination in this circuit as between feed-back voltages above and below a predetermined value. However, comparable fine regulation of the excitation of the brake 47 is achieved in the circuit of FIG. 3.

For example, if motor 20 tends to speed up slip or feed-back voltage across lines 114 will drop, thus reducing the negative potential across potentiometer 216. Accordingly, the grid 152 of tube 148 will be driven more positive to increase the output of the tube to the winding 48 of the eddy current brake 47, hence increasing the drag on the motor and tending to lower its speed. Conversely, a reduction of the speed of the motor will correspondingly increase its slip or feed-back voltage to increase the negative potential across potentiometer 216 to tend to reduce the excitation of grid 152 of tube 148 and reduce excitation to the brake winding 48 and permit the motor to regain speed.

The circuit shown in FIG. 4 discloses an embodiment of the invention in which feedback from the secondary circuit of the motor 20 to the brake control circuit is completely eliminated. In the circuit of FIG. 4, grid line 179 is directly connected to the output terminal of potentiometer 176 and brake excitation is at all times controlled in accordance with the position of the controller handle 33 and the corresponding mutual inductance between controller windings 102 and 104.

The circuit shown in FIG. 4 will not control the speed and torque of the motor as closely as in the circuit of FIGS. 2 and 3 because of the loss of regulating effect on the brake during speed fluctuations which occur at a fixed position of the controller handle. However, inasmuch as the primary speed and torque control effects on the motor occur in the motor's secondary resistance circuit, the brake control circuit of FIG. 4 will provide adequately fine control for many purposes.

As shown in FIG. 2 the circuit between the tube 148 and the winding 48 of the brake 47 may be optionally provided with control elements which will cut out the entire system in the event of either a short or an open circuit in the brake winding circuit. For this purpose a differential relay DR numbered 217 which controls relay contactor switch DR numbered 218 in line 37 of FIG. 1 is provided. Differential relay 217 is provided with both shunt and series wound actuating coils. Series wound actuating coil 219 is in series with line 143. The shunt wound actuating coil 220 is in parallel with brake winding 48 and across the lines 142, 143 through line 222. Respective potentiometers 223, 224 and condenser 221 provide means for balancing the relay with respect to normal conditions of voltage across lines 142, 143 and current flowing in line 143.

Under normal conditions of current and voltage DR relay 217 will be inactive and relay switch 218 will be normally closed. However, if a short circuit develops across the brake winding 48, the excess of current drawn in line 143 will actuate series wound coil 219 to energize the relay 217 and open switch 218 to de-energize the entire system. Conversely, if coil 48 is open circuited the voltage between lines 142, 143 may raise when conditions are such that coil 48 should ordinarily be drawing heavy current. Accordingly, the shunt winding 220 of the relay will energize the relay and open switch 218, again de-energizing the entire system.

Mechanical brake 45 is of the type which is normally set, but which has a solenoid operating coil 225 connected by lines 226 to the motor primary input leads 21. Accordingly, under any circumstances under which the motor is supplied with voltage across its primary windings, coil 225 will be actuated to release the mechanical brake 45.

As shown in FIGS. 14 and 15, the induction controller 29, diagrammatically illustrated in FIG. 1, desirably comprises rotary apparatus having a shell 229 for the support of the circular field frame 230. The rotor core or armature 105 is supported centrally in the field frame on the shaft 231 to which it may be mounted in various angular positions by means of the key 232 as will hereafter be described more in detail. Shaft 231 extends through end wall 233 and carries the controller handle 33. Shaft 231 also extends through end wall 228 and carries therebeyond a cam 234 which actuates the respective operating buttons of switches 34, 35 as shown in FIG. 14.

Cam 234 may be provided with a peripheral notch 235 within which the spring pressed ball detent 236 may seat to impositively hold the handle 33 in the neutral position of the controller in which both switches 34, 35 are open. Movement of the handle in a clockwise direction as viewed in FIG. 14 will rotate cam 234 to retract ball 236 from engagement with the cam notch 235. In this movement of the cam switch 34 will close by riding up on the cam surface 237. The actuator button of switch 35 will remain disengaged in the clockwise movement of handle 33.

Counterclockwise movement of handle 33 will depress the actuator button for switch 35 which rides up on the cam surface 238 of cam 234. The respective cam surfaces 237, 238 are provided with cam notches 239, 240 within which the ball 236 impositively seats in the "full on" position of the controller handle 33 in either direction of its movement. The total movement or throw of the handle 33 between extreme positions is desirably limited to 90°.

The laminated field frame 230 may be provided either with salient poles or with distributed winding poles for the primary and secondary windings of the controller. The distributed pole arrangement as such is well known and is suggested in FIG. 15. To simplify the following explanation, however, diagrammatic FIGS. 12 and 13 illustrate a salient four-pole structure. Other multiple pole arrangements, of course, are feasible and are within the scope of the present invention.

As shown in FIGS. 12 and 13, field frame 230 is provided with opposed primary poles 243, 244 and with corresponding opposed secondary poles 245, 246, 90° arcuately displaced therefrom. Primary winding 102 may be wound on both poles 243, 244 as illustrated in the drawing and in such a way that magnetomotive flux generated by the respective windings on the respective primary poles 243, 244 will be in the direction of the arrows 241, 242 in FIG. 12.

The rotor 105 desirably comprises a laminated split ring. Two magnetically insulated arcuate armature sections 247, 248 are disposed concentrically with respect to the curved pole faces of the primary and secondary poles. The air gap between the rotor periphery and the pole faces is desirably uniform to minimize variations in magnetizing current drawn by the primary windings on rotation of the armature. The respective armature segments 247, 248 are magnetically separated by the air gaps 249, 250 therebetween. Accordingly, little or no flux will leak between armature segments.

For purposes of exemplification and assuming a controller for combined FIGS. 1 and 2 of the drawings, secondary winding 103 in the grid circuit of thyratron 56 may be wound on secondary pole 245 and secondary winding 104 in the grid circuit of thyratron 148 may be wound on secondary pole 246. In practice the secondary windings may be distributed between secondary poles.

With the rotor in neutral position as shown in FIG. 12, air gaps 249, 250 are aligned with the mid-points on the faces of poles 243, 244 and magnetically undivided rotor segments bridge between the respective primary and secondary poles. In this position the theoretical voltage output of the secondary windings 103, 104 will be zero.

The path of flux generated by the primary windings is illustrated by flux paths 253, 254, 255, 256. Flux generated by the respective opposed primary windings on primary poles 243, 244 cancel out in the secondary poles 245, 246. Accordingly, the net flux in the secondary poles is zero and the output of the secondary windings 103, 104 is zero.

It will be noted that in FIG. 12 the air gaps 249, 250 in the split ring rotor are substantially out of the magnetic circuit through the rotor segments 247, 248 and between respective primary and secondary poles. The air gap surfaces of rotor segments 247, 248 desirably have an arcuate extent of about 165° in a four-pole device and accordingly span practically the entire angle between centers of adjacent primary and secondary poles. Accordingly, with handle 33 in neutral position as shown in FIG. 12, none of the flux on paths 253—256 need pass through the air gaps 249, 250. When rotor 105 is placed in its FIG. 13 position the air gaps 249, 250 are moved to intervene in the magnetic circuit of flux paths 254, 256 and magnetically subdivided rotor portions 247, 248 bridge between the respective primary and secondary poles. Accordingly, the flux flowing on paths 254, 256 is much weaker than the flux flowing on paths 253, 255 which continue to pass through unbroken magnetic portions of the rotor segments 247, 248. Accordingly, the flux on paths 254, 256 does not cancel out the flux on paths 253, 255 and there will be a net flux flowing through secondary poles 245, 246 which will induce voltage in the secondary windings 103, 104.

FIG. 13 illustrates the position of the rotor in which air gaps 249, 250 are fully effective to reduce the flux on paths 254, 256 to minimum value. In this position of the rotor the voltage output of the secondary windings is at a maximum. Winding 103 is in the circuit of the thyratron 56 and tends to drive the tube grid positive. Winding 104 is in the circuit of thyratron 148 and tends to drive the tube grid negative. Thus when the controller is in its FIG. 13 position, tube 56 is driven for maximum output for maximum speed and torque of motor 20 and tube 148 is driven for minimum output for minimum drag of brake 47. Positions of the rotor 105 intermediate that shown in FIGS. 12 and 13 will result in intermediate voltage outputs of the respective secondary windings 103, 104 for intermediate effects on the respective tubes 56, 148.

Where motor 20 is used to power bridge and trolley motions of the crane the brake 47 and its circuit may be omitted, as aforestated. Under this circumstance there is no secondary winding 104 in the controller. Secondary winding 103 is desirably then wound on both secondary poles 245, 246 and at the neutral position of handle 33 the air gaps 249, 250 and armature segments 247, 248 are symmetrically disposed as shown in FIGS. 12 and 16. Accordingly, the excitation characteristics of tube 56 will be the same for both directions of handle movement.

Where motor 20 is used to power the hoist motion of the crane and the brake 47 is connected thereto, rotor segments 247, 248 and air gaps 249, 250 may optionally be asymmetrically disposed with respect to the controller handle and primary holes of the controller as shown in FIG. 17. This has the effect of reducing motor torque and increasing brake excitation in the lowering direction of controller handle movement and increasing motor torque and reducing brake excitation in the hoisting direction of controller handle movement.

The asymmetrical mounting of the split ring rotor 105 on shaft 231 is conveniently accomplished in the device of the present invention by providing eccentrically related keyways on the rotor 105. The key 232 by which the rotor 105 is mounted on shaft 231 may be disposed in one or the other of two keyways 257, 258. Keyway 258 is arcuately offset by approximately 186° from keyway 257. Keyway 257 aligns radially with the gaps 249, 250. As shown in FIG. 16 handle 33 aligns with the gaps 249, 250 when the key 232 is engaged with keyway 257. Accordingly, the output in both secondary windings 103, 104 will be zero at the neutral position of the handle as illustrated in FIG. 16. Movement of handle 33 in either direction from neutral will result in symmetrical excitation characteristics for the circuits controlled by the secondary windings.

However, when key 232 is engaged in keyway 258, as shown in FIG. 17, the gaps 249, 250 and segments 247, 248 will be asymmetrical with respect to the neutral position of the handle 33. If handle 33 is moved clockwise in FIG. 17, this being in a direction to close switch 34 in the hoist direction, both secondary windings 103 and 104 will have voltage output higher than would otherwise be the case. Motor torque will be correspondingly increased and brake excitation correspondingly reduced as aforestated. If handle 33 is moved counterclockwise in FIG. 17, this being in a direction to close switch 35 in the lowering direction, both secondary windings 103 and 104 will have an initial abnormally low voltage output as the air gaps 249, 250 move past the mid-points of the primary pole faces and voltage output increases in both windings will be delayed. Motor torque will be correspondingly low and brake excitation will be correspondingly high, as aforestated.

The several potentiometers in the grid circuit of tube 148 may be so adjusted that in the last five degrees of movement of handle 33 in the lowering direction the brake 47 will be completely de-energized and in the last twenty degrees of movement of handle 33 in the hoisting direction the brake 47 will be completely de-energized. This differential result is achieved because of the angular offset of key 232 6° from the axis through the air gaps. There is also desirably about 3° of lost motion of handle 33 at standstill before either switch 34, 35 will close, this plus the 12° cumulative asymmetry of the rotor accounts for the 15° difference in the point in the throw of the handle in one direction or the other at which the brake will be completely de-energized.

As shown in FIG. 7 the secondary resistance portions 60 in the rotor circuit of the motor 20 may optionally be provided with a manually operated switch 260 to selectively cut out some of the resistance in the secondary circuit of the motor. Switch 260 is under control of the operator and its closure provides for increased torque output of the motor even if the controller handle is at a low speed setting. For example, if the hoist is lifting an excessive overload, closure of switch 260 will short circuit resistance portions 261 of resistance 60 to increase the flow of secondary current and increase motor torque and hoist pressure even though the controller handle is in a relatively low speed position.

What is claimed is:

1. In a device of the character described, the combination with a motor, a brake coupled to said motor, said brake having electric control means, said motor having a circuit and means in said circuit for controlling the power supplied to the motor and including a control element, said control means for said brake having a winding, of means for respectively energizing the control element in the power control means for the motor and the winding of the brake control means, said means comprising amplifiers having their outputs respectively connected to said control element and winding, said amplifiers having control elements and control circuits for said elements, and manually actuated controller means in said circuits for said control elements for applying voltages on said control elements in accordance with desired motor operation.

2. The device of claim 1 in which said manually actuated controller means comprises an induction controller having a primary and a secondary winding, said secondary winding being disposed in the control element circuits of said amplifiers, a field frame for said windings and an armature relatively movable with respect to said field frame for affecting the magnetic circuit of the field frame and changing the mutual inductance between said primary and secondary windings.

3. The device of claim 2 in which said field frame has a primary pole for said primary winding and a secondary pole for said secondary winding, said armature having magnetically separate armature portions and means for shifting said portions with respect to said primary and secondary poles.

4. The device of claim 3 in which said field frame comprises a shell of magnetic material, said poles having faces disposed about a central rotor cavity, said armature comprising a rotor in said cavity and rotatable on the axis of said shell and concentrically with said pole faces, said armature portions comprising segments having magnetically insulating gaps therebetween, said rotor having one position in which continuous portions of said segment bridge between a primary and a secondary pole and said gaps are out of the magnetic path between said poles, and another position in which said gaps intervene in the magnetic path between said primary and said secondary poles.

5. In a device of the character described, an induction controller comprising a field frame having primary and secondary poles, an armature having an air gap subdividing said armature into magnetically separate portions, and means for moving said armature between one position in which a magnetically undivided portion of said armature bridges between said primary and secondary poles and another position in which a magnetically divided portion of said armature bridges between said primary and secondary poles.

6. The device of claim 5 in which said field frame constitutes a closed ring having a plurality of primary poles and a plurality of secondary poles intermediate said primary poles, said armature comprising a split ring rotor within said field frame, said rotor having a number of rotor segments corresponding to the number of secondary poles, said segment being arcuately spaced to constitute the said air gaps.

7. The combination with an electric motor, a power circuit for said motor including manually actuated control means for selectively driving the motor in forward and reverse directions, and a brake having electric control means, means coupling said brake to said motor, said control means for said brake having a winding, of means to energize said winding and including an electron valve having an output element connected to said winding and a control element having a control element circuit including means for varying the voltage impressed on said control element in response to the manually actuated control means, the means last mentioned including a source of control element voltage and means interconnected with said manually actuated control means for said motor for varying the voltage applied on said control element from said source to lightly energize the brake when the motor is at a standstill.

8. The combination with an electric motor having a circuit including means for controlling motor speed and control circuit means therefor, a brake coupled to said motor, said brake having electric control means including a winding and a source of winding excitation including a circuit to said winding, of a differential relay in said circuit and having a series coil in series with said winding and a shunt coil in parallel with said winding, and control means in the motor control circuit responsive to said relay whereby either a short circuit or an open circuit in the brake winding circuit will actuate said relay and said control means to de-energize said motor.

9. In a device of the character described, the combination with an electric motor and an electrically controlled brake coupled to said motor, said motor having a circuit with speed control means therein including a control impedance, said brake having a control impedance, and means for variably energizing said control impedances for speed control effects on said motor, said means including a manually actuated controller having a handle and control elements respectively in circuit with said impedances, reversing means for said motor and control means therefor connected for actuation by movement of the controller handle through a neutral position thereof, said control elements of the controller being asymmetrically related to said neutral position whereby control effects on the respective control impedances of said motor and brake will differ depending on the direction of motor operation, the means for variably energizing said control impedances further including amplifiers having amplifier output terminals connected to the said control impedances for the energization thereof and having input terminals for amplifier excitation connected to control elements of said controller.

10. In a device of the character described, the combination with an electric motor and an electrically controlled brake coupled to said motor, said motor having a circuit with speed control means therein including a control impedance, said brake having a control impedance, and means for variably energizing said control impedances for speed control effects on said motor, said means including a manually actuated controller having a handle and control elements respectively in circuit with said impedances, reversing means for said motor and control means therefor connected for actuation by movement of the controller handle through a neutral position thereof, said control elements of the controller being asymmetrically related to said neutral position whereby control effects on the respective control impedances of said motor and brake will differ depending on the direction of motor operation, said controller having a primary winding, a secondary winding and an armature connected to said handle and adapted on movement of said handle to change the mutual inductance between said primary and said secondary windings, said armature being disposed asymmetrically with respect to said secondary winding in the neutral position of said handle.

11. The device of claim 10 in which said controller comprises a field frame having primary and secondary poles for said primary and secondary windings, an armature having an air gap subdividing said armature into magnetically separate portions, and means for moving said armature between one position in which a magnetically undivided portion of said armature bridges between a primary and a secondary pole and another position in which a magnetically subdivided portion of said armature bridges between said primary and secondary poles.

12. The device of claim 11 in which said field frame constitutes a closed ring having a plurality of primary poles and a plurality of secondary poles intermediate said primary poles, said armature comprising a split ring rotor within said field frame, said rotor having a number of rotor segments corresponding to the number of secondary poles, said segments being arcuately spaced to constitute the said air gaps.

13. The combination with an electric motor having a wound rotor secondary circuit, of means for effecting and controlling the speed of said motor and comprising power control means in the secondary circuit of the motor including external resistors, a saturable reactor having reactor windings in circuit with said resistors and a saturation winding, a voltage source for said saturation winding including an amplifier and means for controlling the voltage output of said amplifier to said saturation winding including circuit connections to feed back a signal which varies with motor speed from the secondary circuit of the motor to said amplifier including circuit means to discriminate between feedback signals above and below a predetermined value and to change the amplifier output in a manner which differs in accordance with said discrimination.

14. The device of claim 13 in which said circuit means comprises an impedance network having voltage proportioning impedances and voltage comparison means, and means connecting said impedances in circuit with said feedback signal connection whereby the voltage output of said voltage comparison means will be proportioned between said impedances in accordance to whether the feedback signal exceeds or falls below said predetermined vlaue and the amplifier will be differentially energized in accordance with the proportioning of voltages in said network.

15. A combination with an electric motor having a wound rotor secondary circuit and speed control means for the motor provided with control element means the degree of energization of which will control the speed of the motor, a source of applied voltage for said control element means and including an amplifier and a circuit connecting the output of the amplifier to said element means, control means for varying the output of said amplifier and comprising circuit connections to feed back a signal which varies with motor speed from the secondary circuit of the motor to the amplifier and including circuit means to discriminate between feedback signals above and below a predetermined value and to change the amplifier output in a manner which differs in accordance to whether the feedback signal is above or below said predetermined value.

16. The device of claim 15 in which said speed control means comprises external resistors in the secondary circuit of the motor, a saturable reactor having reactor windings in circuit with the resistors and a saturating winding constituting said control element.

17. The device of claim 15 in which said speed control means comprises external resistors in the secondary circuit of the motor and a saturable reactor having reactor windings in circuit with the resistors; and an electrically controlled brake coupled to the motor, said control element means comprising a saturation winding for the saturable reactor and a winding for the brake.

18. The device of claim 15 in which said feedback signals impress a voltage on the amplifier, said signals below said predetermined value corresponding to those occurring during running conditions of the motor, the voltage impressed on the amplifier having a polarity and value adapted to control the amplifier in a manner to vary the energization of said control element means in a manner to tend to maintain the running speed of the motor constant, feedback signals above said predetermined value corersponding to those occurring during plugging of the motor, the resultant voltage impressed on the amplifier having a polarity and value adapted to control the amplifier to vary the energization of said control element means in a manner to improve reversing characteristics of the motor.

19. The device of claim 18 in which said circuit means comprises an impedance network having voltage proportioning impedances and polarized means for the differential proportioning of the voltages across said impedances according to whether the feedback signal exceeds or falls below said predetermined value.

20. The device of claim 19 in which said feedback signal comprises the slip voltage of the secondary circuit of the motor, said discriminating circuit means further comprising reference voltage means against which the slip voltage is compared, said polarized means being responsive to the polarity of the voltage difference between the reference voltage and the slip voltage in proportioning said difference voltage between said network impedances.

21. The device of claim 20 in which said network impedances comprise plural resistances, one of said resistances being disposed in direct series connection with the amplifier and another resistance being out of direct series connection with said amplifier, said impedance network comprising means for selectively applying substantially the full difference voltage aforesaid across said one resistance under one condition of discrimination and for dividing the difference voltage between said one and said other resistance to impose only a fractional part of said difference voltage across said one resistance under another condition of discrimination.

22. The combination with a motor having speed control means including an electrically controlled brake coupled to said motor and a wound rotor secondary circuit for the motor having an external circuit, a first control element to vary the drag of the brake and a second control element to vary the impedance of the external circuit, of means for respectively energizing said first and second control elements, including first and second amplifiers having their outputs respectively connected to said first and second control elements, said amplifiers having control elements and control circuits for said elements, manually controllable means in said circuits for control of said first and second elements in accordance with desired motor operation, the control element circuit of the second amplifier including circuit connections for feeding back a signal from a circuit of said motor which will vary according to motor speed and circuit means adding to the manually controlled voltage for the control element of the second amplifier voltages which vary according to the feedback signal.

23. The device of claim 22 in which the control element circuit of the first amplifier also includes a feedback signal connection from a circuit of said motor which will vary according to motor speed and circuit means adding to the manually controlled voltage for the control element of the first amplifier voltages which vary according to the feedback signal whereby both the impedance of the secondary external circuit and the drag of the brake will be affected by the amplifiers acting in response to the feedback signals.

24. The device of claim 22 in which said feedback signal connections are from the secondary circuit of the motor, said circuit means comprising means to discriminate between feedback signals above and below a predetermined value, the value of said superimposed voltage differing in accordance with said discrimination.

25. The device of claim 24 in which the last mentioned means comprises an impedance network including plural voltage proportioning impedances, one of said impedances being in direct series circuit with the second amplifier control element and another impedance being out of direct series connection with said element, said impedance network further comprising means for impressing substantially the full voltage output of said circuit means across said one impedance under one condition of discrimination and dividing the voltage output of the circuit means between said plural impedances under another condition of discrimination whereby only a fractional part of the output of said circuit means is superimposed on said manually controlled voltage.

26. Apparatus for controlling the speed and direction of rotation of a reversible alternating current electric motor, said apparatus comprising speed control means for the motor including an electrically responsive control element, excitation means for the control element including an amplifier having an output element connected to said control element to vary the energization thereof, discriminating means having an input, a feedback signal circuit responsive to an electric condition of a motor circuit and connected to said input, said discriminating means comprising means to cause a different mode of control of the amplifier over said control element depending on whether or not the feedback signal is above or below a predetermined value which is characteristic of a preselected electric condition of the motor circuit and to energize the control element accordingly to cause normal speed regulating variations in the energization thereof for feedback signals below said predetermined value and to cause an abnormal motor protecting variation in the energization thereof for feedback signals above said predetermined value.

27. Speed and direction control apparatus for a motor having a primary circuit, said apparatus comprising reversing means in said primary circuit for reversing the rotation of the motor, speed control means including electrically controllable means for varying power consumption of said speed control means, an amplifier for variably exciting said electrically controllable means, a manually actuated controller having a control handle with a neutral position and positions at both sides thereof, means operably connecting said controller to said reversing means to run the motor in one direction when the controller handle is at one side of neutral and to run the motor in the other direction when the controller handle is at the other side of neutral, means providing a first variable signal from said controller to said amplifier in stepless intervals for each direction of controller handle movement off neutral for primary control of the amplifier and means for providing a second variable signal to said amplifier which varies with motor speed and which opposes the first signal for regulation of motor speed.

28. The device of claim 27 in further combination with load means coupled to the motor and adapted to exert variable braking torque in response to an electrical signal, a second amplifier for variably exciting said load means, means providing a first variable signal from said controller to said second amplifier in stepless intervals and means for providing a second variable signal to said second amplifier which varies with motor speed.

29. The device of claim 28 in which said amplifiers comprise means for respectively varying excitation of said electrically controllable means and said brake to tend to maintain motor speed constant subject substantially only to speed changes dictated by manipulation of the handle of said controller.

References Cited in the file of this patent

UNITED STATES PATENTS

| | | |
|---|---|---|
| Re. 24,168 | Pell | June 19, 1956 |
| 1,930,279 | Morton | Oct. 10, 1933 |
| 2,013,221 | Stanbury | Sept. 3, 1935 |
| 2,490,629 | Jacobs et al. | Dec. 6, 1949 |
| 2,528,467 | Bulliet | Oct. 31, 1950 |
| 2,600,546 | Kimball et al. | July 17, 1952 |
| 2,676,292 | Spencer | Apr. 20, 1954 |
| 2,687,505 | Shurr | Aug. 24, 1954 |
| 2,704,344 | Winther et al. | Mar. 15, 1955 |

FOREIGN PATENTS

| | | |
|---|---|---|
| 751,030 | Germany | Apr. 27, 1953 |
| 677,358 | Great Britain | Aug. 13, 1952 |